Dec. 15, 1970 J. H. McCOY 3,546,799

DATA RECORDING OR TABULATING DEVICE HAVING REPLACEMENT OR INTERCHANGEABLE SEGMENTS

Filed June 7, 1968 2 Sheets-Sheet 1

Inventor John H. McCoy

Schlesinger, Arbuckle & Harvey
ATTORNEYS

Dec. 15, 1970 J. H. McCOY 3,546,799
DATA RECORDING OR TABULATING DEVICE HAVING REPLACEMENT OR INTERCHANGEABLE SEGMENTS
Filed June 7, 1968 2 Sheets-Sheet 2
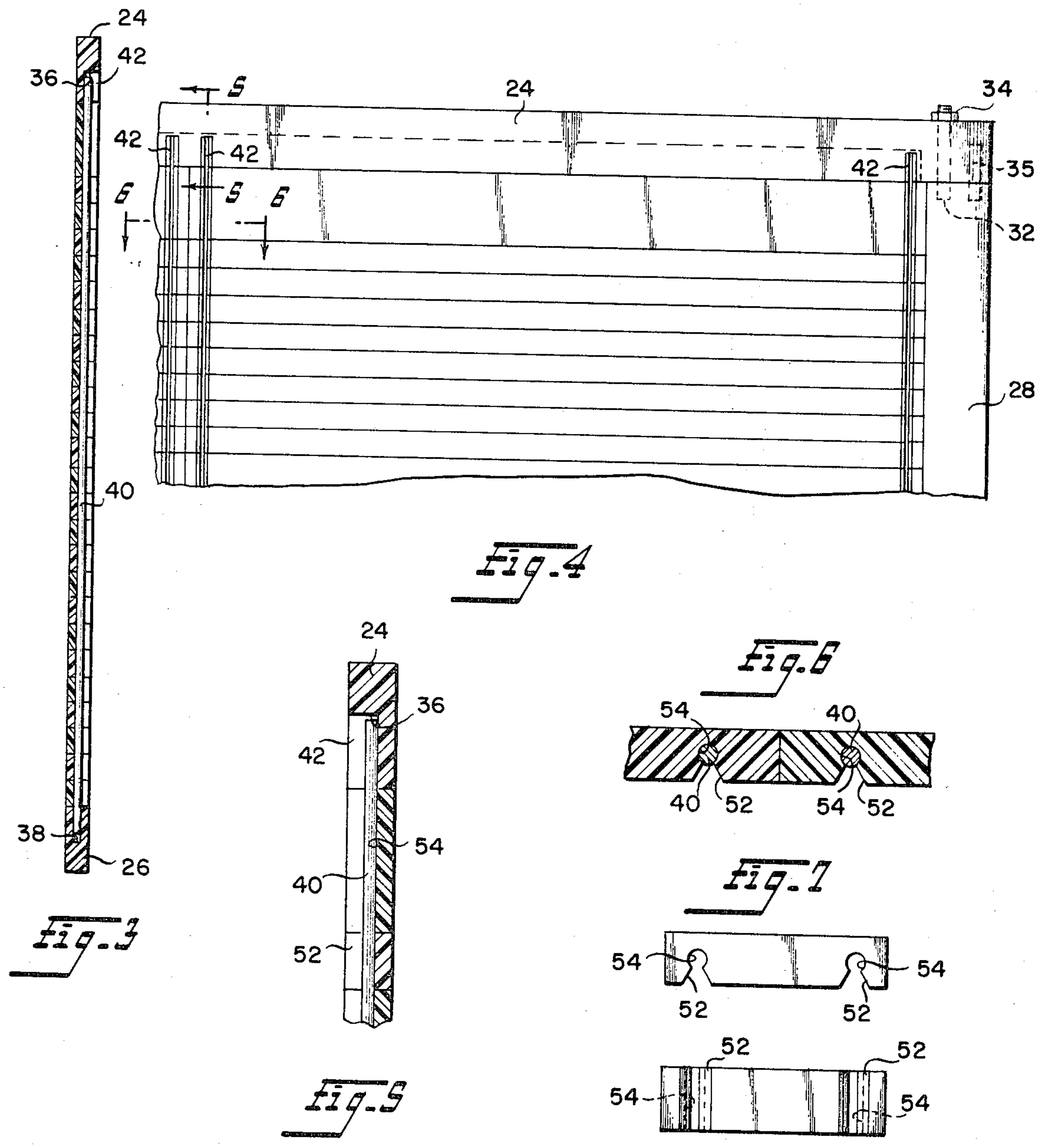
FIG. 3, FIG. 4, FIG. 5, FIG. 6, FIG. 7
FIG. 8
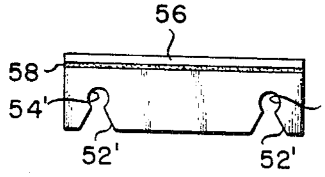
FIG. 9
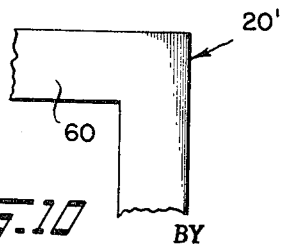
FIG. 10
INVENTOR
John H. McCoy
BY Shlesinger, Arkwright & Garvey
ATTORNEYS 3,546,799

DATA RECORDING OR TABULATING DEVICE HAVING REPLACEMENT OR INTERCHANGEABLE SEGMENTS

John H. McCoy, 1516 Humboldt, Manhattan, Kans. 66502

Filed June 7, 1968, Ser. No. 735,461
Int. Cl. G09f *7/00*
U.S. Cl. 40—63 14 Claims

ABSTRACT OF THE DISCLOSURE

Data recording or tabulating device including a substantially rectangular frame comprising top, bottom and side border elements, the opposed edges of the top and bottom border elements having central, longitudinal recesses, spaced vertical rods extending between the top and bottom border elements, the terminals of the rods lying within the longitudinal recesses thereof, and a plurality of segments, portions of which are detachably engaged with the vertical rods, the segments bearing indicia having a relationship to other segments in its row.

BACKGROUND AND OBJECTS

In the normal recording and maintenance of business records such as the preparation of a depreciation schedule for a number of machines, buildings, etc., several problems arise which are likely to considerably affect the accuracy and reliability of such records, as well as the expeditious handling of the same. These problems include the copying, with possible error, of the data which actually remains the same each time the schedule is prepared. Additionally, the transferring, with possible eror, of identical data from one entire column to a different column at the subsequent reporting date, and the elimination or removal of an entire line or lines from one reporting date to the next, are tedious and time consuming operations.

It is an object of this invention to provide a data recording or tabulating device for facilitating the keeping of business records, the device including a frame within which are arranged a plurality of segments having indicia thereon, the segments being detachably held within the frame in rows and columns and readily replaced or rearranged to reflect periodic changes or adjustments.

Another object is to provide a device of the character described, including a frame, a plurality of spaced, vertical rods within the frame, multiple indicia segments having complemental portions detachably engaged with the vertical rods, the segments being arranged in columns and rows.

A further object is to provide a device as described, wherein the segments may be individually removed from the frame or a whole column of segments may be removed as a unit.

Other objects will be manifest from a consideration of the following description of the presently preferred forms of the present invention taken in conjunction with the appended drawings.

DESCRIPTION OF THE FIGURES OF THE DRAWINGS

FIG. 3 is a sectional view taken along the line 3—3 of FIG. 1, looking in the direction of the arrows;

FIG. 4 is a fragmentary rear plan view of the device of the present invention;

FIG. 5 is a sectional view taken along the line 5—5 of FIG. 4, looking in the direction of the arrows;

FIG. 6 is a sectional view taken along the line 6—6 of FIG. 4, looking in the direction of the arrows;

FIG. 7 is a top plan view of a segment forming a part of the present invention;

FIG. 8 is a rear plan view of the segment;

FIG. 9 is a top plan view of a modified form of segment, and

FIG. 10 is a fragmentary front elevational view of a modified form of a frame forming a part of the present invention.

DESCRIPTION OF FIGS. 1–8

Figures 1, 2:
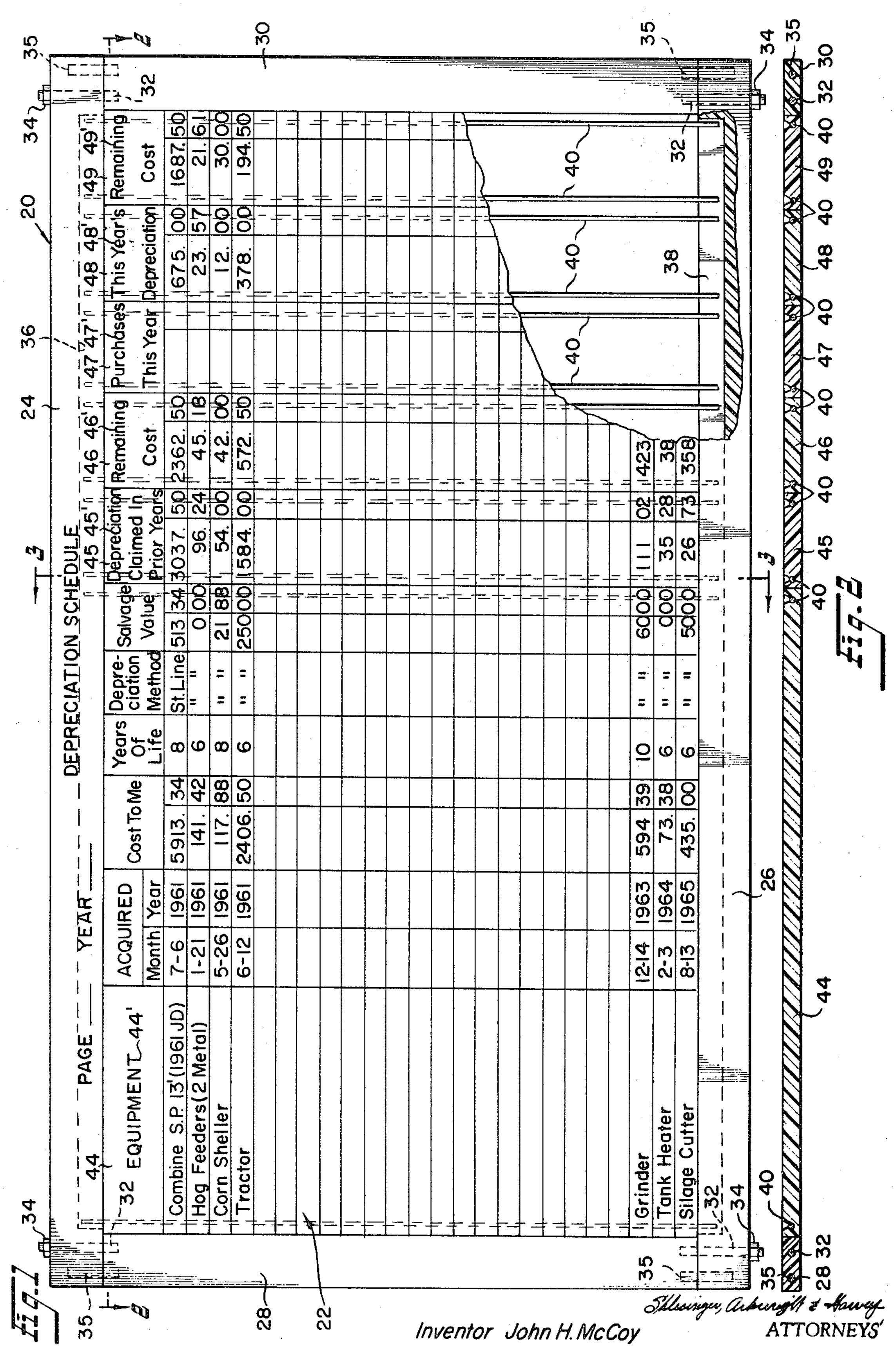
FIG. 1 is a front plan view of the device of the present invention.
FIG. 2 is a sectional view taken along the line 2—2 of FIG. 1, looking in the direction of the arrows.

The data recording or tabulating device of the present invention generally includes an exterior frame designated 20 within which is a changeable, multi-part recording and tabulating section 22.

Both the frame and the parts of the recording and tabulating section are preferably made of a pliable, plastic material such as a thin vinyl product.

Frame 20 includes a top border 24, a bottom border 26 and side borders 28 and 30. Side borders 28 and 30 may be secured to top border 24 and bottom border 26 by means of studs 32 one end of each of which is threadedly engaged with side border 28 or 30, the body of each stud rod extending through the top and bottom borders 24 and 26, the outer ends of the studs being threaded for engagement with nuts 34 for securing the top, bottom and side borders together to form the frame. Any other suitable mechanical or adhesive means may be employed for effecting this purpose. Stub rods 35 are threadedly engaged with side borders 28 and 30 adjacent studs 32, the body of each rod extending into a complemental recess in top border 24 and bottom border 28. These stub rods serve to stabilize side borders 28 and 30.

As shown to advantage in FIG. 3, the top and bottom borders are provided with central longitudinal recesses designated 36 and 38 respectively which are substantially coextensive with the length of the two borders. In accordance with the objects of the present invention, there are provided a plurality of spaced, vertical rods 40, the upper terminals of which extend into recess 36 of top border 24 and the bottom terminals of which are located in recess 38 of bottom border 26. It will be noted from FIG. 1 that rods 40 are strategically spaced and, as shown in FIG. 3, top border 24 is provided with slots 42 to permit ready insertion of the rods through the slots into longitudinal recess 36, for purposes which will be hereinafter more fully set out. In this connection, it is pointed out that the width of slots 42 is preferably slightly less than the diameter of rods 40. This enables the rods to be forced through the slots made in the pliable plastic material of the border into longitudinal recess 36, thereby preventing accidental passage of the rods through the slots while the device of the present invention is in use.

The multi-part section 22 comprises a plurality of independent detachable segments arranged in columns and rows, the segments in each column being designated 44, 45, 46, 47, 48 and 49. Indicia 44', 45', 46', 47', 48' and 49' is applied to the front faces of segments 44, 45, 46, 47, 48 and 49 respectively and to top border 24 directly above the respective columns of detachable segments.

It will be noted from the drawings that segment 44 is illustrated as being elongated in order to accommodate considerably more information than the remainder of the segments. In this way, data may be applied to the segment which never changes once it is entered thereon, until the segment is completely removed. In contrast, segments 45, 46, 47, 48 and 49 are varied periodically and may be either removed and replaced by another segment or may be relocated in the same column or in a different column. For this purpose, segments 45, 46, 47, 48 and 49 are preferably of the same size in order that an interchange from one column to the other may be effected.

Referring now to FIGS. 6 to 8, it will be seen that, adjacent each lateral extremity of the segment, the rear face thereof is provided with a transverse, triangular slot 52 which issues into a circular recess 54 which is adapted to receive vertical rod 40 in the manner shown in FIG. 6. It will be noted from a consideration of FIGS. 6 and 7 that at its innermost point, triangular slot 52 is not as wide as the diameter of vertical rod 40, with the result that a slight pressure must be exerted on the segment to force the pliable plastic to give sufficiently to allow entry of the rod into the circular recess 54. It is believed clear from a consideration of the drawings that segments 45, 46, 47, 48 and 49 may be readily attached to and removed from the frame at will.

It is a salient feature of the present invention to remove an entire column of segments at one time simply by pushing both rods holding the segments at the locus of slots 42 so that the rods and the segments attached thereto drop from the frame, after which the segments may be removed from the rods and replaced as desired. When appropriate, an entire column may be removed and remaining columns moved right or left as desired.

OPERATION

In use of the device of the present invention for a depreciation schedule, segments are prepared for insertion within the frame by writing the desired information thereon, in the manner illustrated in FIG. 1. The respective segments are inserted in place and, after a period of time when it is necessary to up-date the schedule, appropriate segments are removed and replaced by new segments bearing new indicia thereon, or the segments are removed from one column and placed in another.

In this way, a ready record is immediately available and, by a minimum of work, the new depreciation schedule may be quickly prepared. Of course, if necessary photocopies may be taken of the device for keeping this record for filing.

Devices made in accordance with the present invention may be of various sizes and the segments within the frame may also be of different length and widths to accommodate the desired information necessary for the particular records being kept.

DESCRIPTION OF FIG. 9

In FIG. 9 there is illustrated a modified form of segment constructed in accordance with the present invention. In this form of the invention parts which are similar to those shown in FIGS. 1 to 8 are identified by like, primed numbers. In this form of the invention, it is contemplated that instead of writing directly on the segment, a sticker or the like 56 having an adhesive 58 on its rear face is applied to the segment, the sticker bearing new indicia. In accordance with this form of the invention the sticker may of course be readily removed and replaced by a new sticker, as desired.

DESCRIPTION OF FIG. 10

In FIG. 10 there is illustrated a modified form of frame which is designated 20'. In this form of the invention instead of constructing the frame of separate pieces to form the top, bottom and side borders, the frame comprises a single continuous border 60 of monolithic construction requiring no mechanical or adhesive means to secure the parts together. In this form of the invention, the manner of usage thereof, and the application of the recording and tabulating section to the interior portion thereof, is the same as in the form of invention illustrated in FIGS. 1 to 8.

While there has been herein shown and described the presently preferred forms of the invention, it is to be understood that such has been done for purposes of illustration only, and that various changes may be made therein within the scope of the appended claims.

What I claim is:

1. A data recording or tabulating device including
(a) a frame,
(b) said frame including top, bottom and side borders,
(c) the opposed edges of said top and bottom borders, being provided with aligned longitudinal recesses in said frame,
(d) spaced support rods extending between said top and bottom borders,
(e) the terminals of said support rods being positioned in the longitudinal recesses of said top and bottom borders, and
(f) a plurality of indicia-bearing segments for mounting within the frame in rows and columns,
(g) said segments including transverse recesses complementing and adapted to receive, said support rods for holding the segments within the frame.

2. The data recording or tabulating device of claim 1 wherein
(a) said top border is provided with slots in communication with the longitudinal recess, to facilitate insertion of the support rods within the frame and removal of the rods together with the segments attached thereto, as a unit.

3. The data recording or tabulating device of claim 1, wherein
(a) said support rods are of a circular cross section and
(b) the transverse recess of the segments comprise triangular slots which issue into circular recesses adapted to receive said support rods.

4. The data recording or tabulating device of claim 3 wherein
(a) said frame and segments are made of a pliable material.

5. The data recording or tabulating device of claim 1 with the addition of
(a) an indicia-bearing member adhesively secured to one face of said segment.

6. The data recording or tabulating device of claim 1, wherein
(a) said frame is of multi-part construction, and
(b) means for securing the parts of the frame together.

7. The data recording or tabulating device of claim 1, wherein
(a) said frame is of unitary construction.

8. The data recording or tabulating device of claim 1, wherein
(a) the faces of said indicia-bearing segments are uniplanar with the faces of the top, bottom and side borders of said frame.

9. A data recording or tabulating device including
(a) a frame,
(b) said frame including top, bottom and side borders,
(c) the opposed edges of said top and bottom borders being provided with aligned longitudinal recesses in said frame,
(d) said top border being provided with a plurality of slots in communication with the longitudinal recess therein,
(e) spaced support rods extending between said top and bottom borders,
(f) the lower terminals of said support rods being positioned in the longitudinal recess of said bottom border,
(g) the upper terminals of said support rods being selectively pushed through the slots in the top border into the longitudinal recess therein, and
(h) a plurality of indicia-bearing segments for mounting within the frame in rows and columns,
(i) said segments including transverse recesses complementing and adapted to receive, said support rods for holding the segments within the frame uniplanar with the faces of the top, bottom and side borders of the frame, (j) whereby said indicia-bearing segments may be selectively and individually removed from the frame by disengagement from the support rods, or may be removed in columns by removal of selected support rods having indicia-bearing segments attached thereto.

10. The data recording or tabulating device of claim 9, wherein (a) said support rods are of a circular cross section, and (b) the transverse recess of the segments comprise triangular slots which issue into circular recesses adapted to receive said support rods.

11. The data recording or tabulating device of claim 9, wherein (a) said frame and segments are made of a pliable material.

12. The data recording or tabulating device of claim 9 with the addition of (a) an indicia-bearing member adhesively secured to one face of said segment.

13. The data recording or tabulating device of claim 9, wherein (a) said frame is of multi-part construction, and (b) means for securing the parts of the frame together.

14. The data recording or tabulating device of claim 9, wherein (a) said frame is of unitary construction.

References Cited

UNITED STATES PATENTS

| | | | |
|---|---|---|---|
| 583,852 | 6/1897 | Shesler | 40—142UX |
| 2,092,508 | 9/1937 | Hammar | 40—142 |
| 2,632,271 | 3/1953 | Nigg | 40—140 |
| 2,805,084 | 9/1957 | Hall | 40—63X |
| 2,937,460 | 5/1960 | Everett | 40—140X |
| 3,022,591 | 2/1962 | Faulkner | 40—140 |
| 3,028,700 | 4/1962 | Faulkner | 40—140 |
| 3,292,851 | 12/1966 | Tippin et al. | 116—135X |

JEROME SCHNALL, Primary Examiner

R. CARTER, Assistant Examiner

U.S. Cl. X.R.

40—142